United States Patent [19]

Massa

[11] 4,231,112

[45] Oct. 28, 1980

[54] HIGH-POWER UNDERWATER TRANSDUCER WITH IMPROVED PERFORMANCE AND RELIABILITY CHARACTERISTICS AND METHOD FOR CONTROLLING SAID IMPROVED CHARACTERISTICS

[75] Inventor: Frank Massa, Cohasset, Mass.

[73] Assignees: Fred M. Dellorfano, Jr.; Donald P. Massa, both of Cohasset, Mass.

[21] Appl. No.: 59,656

[22] Filed: Jul. 30, 1970

[51] Int. Cl.[2] .......................... G01V 1/00; H04B 13/00

[52] U.S. Cl. ...................................... 367/158; 73/579; 174/140 CR; 367/159

[58] Field of Search ............. 340/10; 174/127, 140 R, 174/140 C, 140 CR, 143; 367/158; 73/579

[56] References Cited

U.S. PATENT DOCUMENTS

| | | | |
|---|---|---|---|
| 2,251,540 | 8/1941 | Buschbeck et al. | 174/127 |
| 2,272,984 | 2/1942 | Ritzmann | 340/10 |
| 3,146,518 | 9/1964 | Kishida | 174/143 |
| 3,262,093 | 7/1966 | Junger et al. | 340/10 |
| 3,421,139 | 1/1969 | Siebert | 340/10 |

*Primary Examiner*—S. C. Buczinski

[57] ABSTRACT

A piezoelectric ceramic cylinder is positioned between a vibratile piston and a matched rigid mass element. To prevent corona, the electrodes on the ceramic cylinder are covered with an insulating material in the region near the edges of the electrodes where a corona might otherwise form. A low-loss rubber compound and a molded rubber support cradles the transducer assembly. A special manufacturing technique uses a standard weight supported on the cylinder to affect the resonant frequency of the cylinder and enable them to be segregated into classes according to their resonant characteristics.

11 Claims, 2 Drawing Figures

FIG. 1
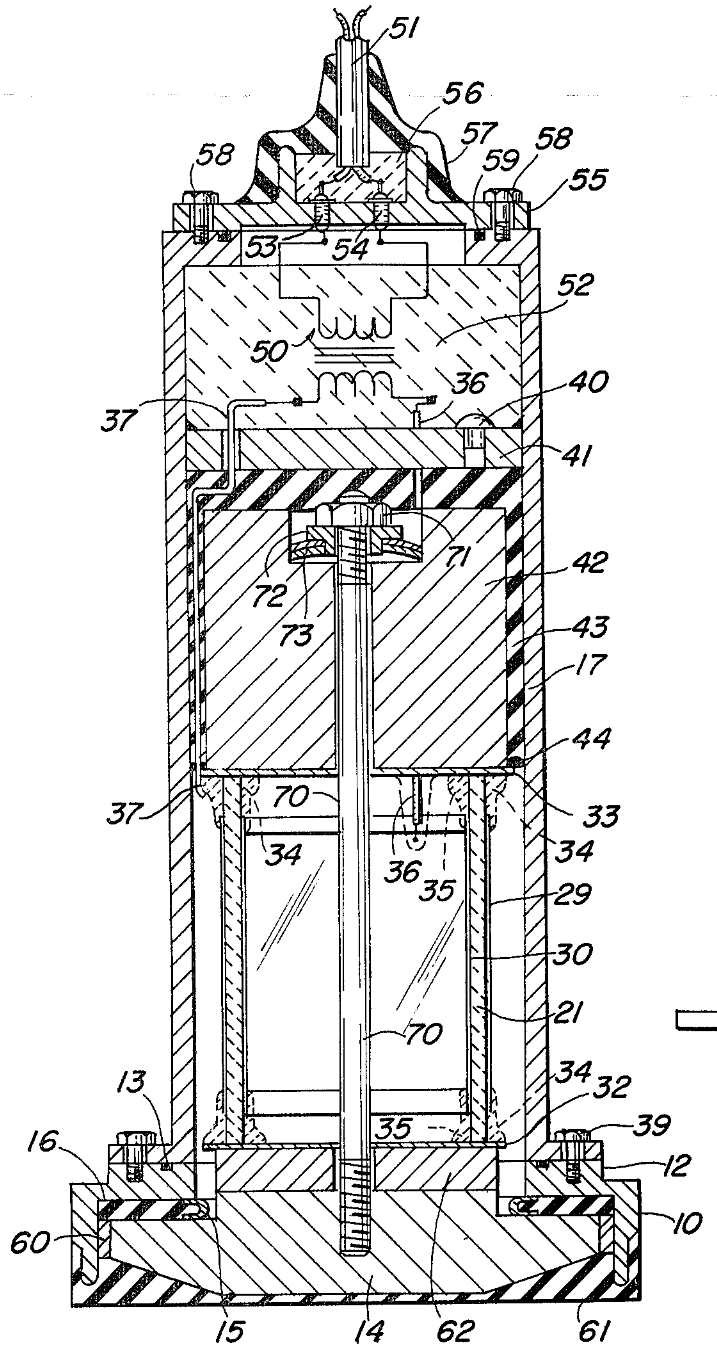
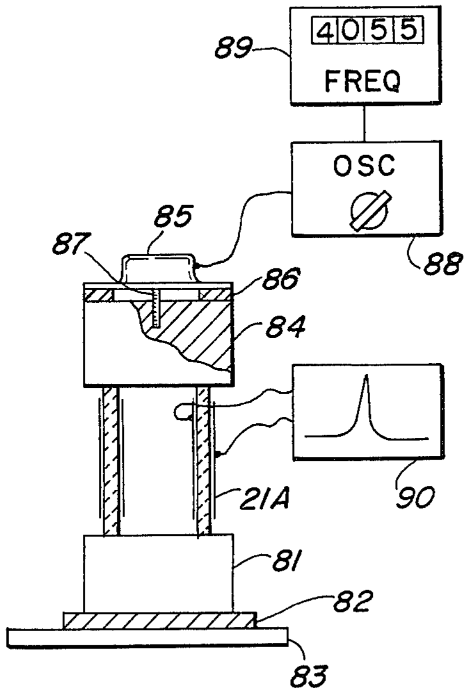
FIG. 2

HIGH-POWER UNDERWATER TRANSDUCER WITH IMPROVED PERFORMANCE AND RELIABILITY CHARACTERISTICS AND METHOD FOR CONTROLLING SAID IMPROVED CHARACTERISTICS

This invention relates to means for and methods of improving the performance characteristics of transducers and, more particularly, to increasing the reliability of these transducers over extremely long periods of operation.

Although the invention is not limited thereto, it is particularly concerned with underwater transducers, and even more particularly with high-power transducers, such as those which are used in sonar applications. The uniformity and reliability of these transducers is of greatest importance in the high-power arrays wherein many transducers are employed in a geometrical pattern. These transducers are selectively driven to produce concentrated sound energy in a controlled beam pattern. The importance of improving the uniformity and reliability of these sonar transducers becomes more apparent when one reflects upon the extremely costly process of drydocking ships or submarines for servicing sonar transducers which have failed during operation.

Typical of the transducers currently being used in sonar arrays are mass-loaded, piezoelectric-driven pistons sealed within a waterproof housing structure which is capable of being mounted in array configurations. Transducer structures of this type are shown in U.S. Pat. Nos. 3,328,751 dated June 27, 1967; 3,474,403 dated Oct. 21, 1969; and 3,199,071 dated Aug. 3, 1965. A typical illustration of a configuration of transducer elements mounted in a planar array is shown in U.S. Pat. No. 3,492,634 dated Jan. 27, 1970. All of these patents are assigned to the assignee of this invention.

At present, there are three reliability problems that urgently require solution in order to improve high-power underwater transducers. This is especially true for transducers employing polarized ceramic cylinders in their construction (such as is illustrated in FIG. 3 of U.S. Pat. No. 3,199,071 or in FIG. 2 of U.S. Pat. No. 3,328,751).

First, there is an electrical breakdown due to corona formation responsive to the very high voltages that are necessarily applied across the ceramic elements during high-power operation. Another serious source of transducer failure is due to a corona formation between the electrode surfaces of the ceramic cylinders and the adjacent metallic piston and tail mass surfaces which make contact with the ends of the cylinder.

Second, over long periods of time, water vapor permeates the interior of the transducer, such as permeation through rubber gaskets.

Third, it is difficult to achieve a high degree of uniformity in the performance characteristics in this type of transducer because there are large inherent variations in the piezoelectric characteristics of the ceramic cylinders used in the transducer construction.

When a cylinder of polarized lead-zirconate-titanate ceramic is used to drive a piston in a mass-loaded transducer, such as illustrated in FIG. 3 of U.S. Pat. No. 3,199,071, the resonant frequency of the vibrating system is subjected to serious variations from element to element. These variations occur in the piezoelectric "constants" of the ceramic material. Therefore, even if the cylinder is machined with extremely tight dimensional tolerances, the mechanical stiffness of the ceramic may vary appreciably from cylinder to cylinder since the Young's modulus of the ceramic material actually varies within a single production lot.

This invention greatly increases the corona threshold voltage in a ceramic mass-loaded transducer assembly, and it also increases the uniformity of the performance characteristics among large quantities of manufactured transducer element assemblies.

Accordingly, an object of this invention is to improve the uniformity of the performance characteristics of mass-loaded ceramic transducers. Here, an object is to overcome the effects of inherent variations in the characteristics of the ceramic elements.

Another object of this invention is to greatly improve the corona resistance of a ceramic transducer assembly, especially when operating at high-power levels.

A further object of this invention is to improve the reliability of underwater transducers by greatly reducing the permeability of water vapor into the interior of the transducer during long periods of immersion in the ocean.

Still another object of this invention is to provide a method for determining the dynamic stiffness characteristics of polarized ceramic cylinders. In particular, an object is to segregate the ceramic cylinders according to their performance characteristics during the production and assembly of the transducers.

A further object of this invention is to provide a method of individually matching ceramic cylinders having different measured stiffness characteristics with weights having different inertia characteristics to give a uniform combination characteristics. Here, an object is to select and combine mechanical structural elements whereby the variations of the ceramic elements are neutralized to thereby produce greater uniformity in performance characteristics.

In keeping with an aspect of the invention, these and other objects are accomplished by providing a matched piezoelectric ceramic cylinder and inertial mass element. The inertial mass element is positioned between a vibratile piston and the matched ceramic cylinder. To prevent corona, the electrodes on the ceramic cylinder are covered with an insulating material in the region near the edges of the electrodes where a corona might otherwise form. A low-loss rubber compound and a molded rubber support cradles the transducer assembly. A special manufacturing testing technique uses standard weights coupled to the ends of the cylinder to affect the resonant frequency thereof. This testing enables the elements to be segregated into classes according to their characteristics.

Other objects of the invention will become more apparent from a study of the following description in which the novel features characterizing the invention are set forth. However, the invention itself, both as to its organization and method of operation, as well as the advantages thereof, will be understood best from a study of the following description taken in conjunction with the accompanying drawings wherein:

FIG. 1 is a longitudinal cross-sectional view of a mass-loaded ceramic transducer which schematically illustrates some of the details of my invention; and FIG. 2 is a schematic illustration of a method of accurately measuring the dynamic stiffness characteristic of the individual ceramic cylinders.

Briefly, the uniformity of transducer resonance frequency is improved, and also the corona breakdown voltage threshold is materially increased, by this invention. In addition, FIG. 1 shows improvements including a design for molding a rubber covering over the surface of the vibratile piston and its surrounding housing structure. As a result, there is an improvement in reliability throughout the entire lifetime of the transducer. Moreover, production control is such that the uniformity of the individual electromechanical vibrating systems can be achieved during the large scale manufacture of the transducers.

In greater detail, FIG. 1 shows a rigid, cup-shaped open housing structure 10 which has an inwardly turned circular flange at the rear end portion 12 thereof. An O-ring 13 is positioned in a groove in the flange to seal the structure to the remainder of the transducer housing. The periphery of the wall portion of the housing structure 10 has an internal surface with contours which provide a clearance surrounding the outer peripheral surface of a vibratile piston 14.

The radiating face of the piston 14 is preferably tapered toward its outer peripheral region in order to increase the resonant frequency of the flexural mode of piston vibration. Thus, this taper insures a more nearly uniform displacement over the entire area of the piston during the operation of the transducer.

A rubber gasket 16 is bonded between the inside rear peripheral surface of the piston 14 and the mating flat inner surface of the housing 10. Any suitable cement, such as epoxy, may be used for cementing the gasket 16 to the mating surfaces of the piston 14 and housing 10. In order to provide a vapor barrier which blocks permeability through the gasket 16, a flexible metallic annulus 5 is cemented into a recessed step provided on the inside diameter region of the gasket 16. The compliance of this metallic vapor seal 15 is preferably higher than the compliance of the gasket 16. It is also preferable to choose the compliance of the gasket 16 so that the resonant frequency of the housing structure 10, in combination with the added mass of a tubular housing 17, is at least an octave below the lower operating frequency of the transducer assembly.

The driving element of the transducer is a polarized piezoelectric ceramic cylinder 21. The polarization is through the thickness of the wall of the ceramic. The electrode surfaces 29 and 30 are applied in a conventional way, such as fired silver. In a conventional transducer construction employing a ceramic cylinder with electrode surfaces 29 and 30, there is a serious electrical deterioration when there is corona between the ends of the electrodes or between the electrodes and metallic surfaces near the end of the ceramic cylinder. As a specific example, I have found that, near the end of a lead-zirconate-titanate cylinder (approximately 4″ diameter and $\frac{3}{8}$″ wall thickness), a corona discharge occurs between the electrodes and adjacent metal surfaces if a potential of about 1,500 volts r.m.s. appears between the electrodes and such adjacent surfaces. Such corona occurs even when there is a margin of one-half inch between the ends of the electrodes and the end of the ceramic cylinder.

According to the invention, the corona discharge threshold is raised to 10,000 volts r.m.s. if a pair of thin bakelite washers 32 and 33 are placed between the ends of the ceramic cylinder and the abutting metal surfaces. Also, to maintain this high corona threshold, a bead 34, 35 of insulation material is applied to cover the entire region of the ceramic between the exposed edges of the electrodes and the attached end faces of the ceramic cylinder. While it is not absolutely essential, these beads may be tapered to form a corona stress cone. A suitable insulating material which can be so applied to form such stress cone is an insulation filler such as epoxy or electrical baking varnish. Similar dielectric coatings are provided over the regions of the electrical conductors 36 and 37, where they are soldered to the electrode surfaces 29 and 30. Preferably, the conductors 36 and 37 have solid dielectric insulation and are thereby made corona resistant.

A tubular housing structure 17 is attached to the housing 10 by means of the bolts 39. The wires 36 and 37 pass through a bulkhead 41 positioned inside the housing 17. The inner space surrounding the vibrating structure is evacuated and filled with dry nitrogen and then sealed with a rubber plug 40. However, prior to such sealing, the entire clearance space surrounding the tail mass 42 is filled with a low-loss rubber compound 43 such as silicone rubber. This compound may be poured into the region as a liquid and then cured. A soft O-ring seal 44 is provided at the lower end of the tail mass 42, in order to prevent the silicone material from flowing beyond the edge of the tail mass structure.

The silicone rubber compound 43 is selected because it has a very low frictional loss. This insures a loss-free vibration of the inertial mass 42. Also, the filling of the space—and the elimination of air—surrounding the high-voltage cables 36 and 37 greatly increases the corona threshold of the electrical assembly. The spacing between the inertial tail mass 42 and bulkhead 41 is selected so that the compliance of the silicone rubber filling provides a large pressure release system which permits the successful operation of the transducer in deep water.

In keeping with the invention, the gasket 16 does not have to take up all of the hydrostatic pressure acting upon the piston diaphragm 14 during its submersion in deep water. A large portion of this pressure is taken up by the silicone rubber which fills the space between the bulkhead 41 and the inertial tail mass 42. Actual experimental tests have shown that this type of pressure release system maintains uniformity of response and impedance characteristics at water depths extending down to 1,000 ft.

The silicone compound 43 provides a high shock resistance to the transducer assembly. In greater detail, the silicone rubber 43 cradles the massive inertial tail mass structure 42 within the tubular housing 17. When the transducer is subjected to underwater explosion shocks, there is no relative motion between the housing and the inner transducer assembly. This immobility precludes a ceramic fracture which might otherwise occur during the resulting high, transient shock wave. Otherwise, the fracture could occur if the inertial tail mass 42 shifted within the tubular housing 17.

A coupling transformer 50 has one high-voltage winding connected to the transducer electrodes via conductors 36 and 37, and another low-voltage winding connected to the terminals 53 and 54 which extend through the surface of the end plate 55. Cable 51, which has a waterproof jacket, completes a connection from the transducer terminals 53 and 54 to suitable electrical equipment which might be in a ship or on the surface of the ocean for example.

The transformer 50 is potted within a suitable insulating compound 52 inside the space defined by the housing 17 and the bulkhead 41. The cable connection region is preferably potted within a rigid epoxy 56. A flexible rubber compound 57 is molded over the material 56 to further seal the cable 51 to the end plate 55. The bolts 58 attach the end plate 55 to the open end of the tubular housing 17. An O-ring seal 59 further seals and completes the assembly.

It is thought that the remaining components and structure will be understood from a description of the procedure followed to manufacture the inventive transducer. More particularly, a preferred procedure is to begin by cementing the gasket and metallic seal assembly 16 and 15 to the flat inside surface of the housing structure 10. Suitable spacers are placed around the periphery of the vibratile piston 14. Then, cement is applied to the rear flat peripheral surface of the piston 14 and to the opposite side of the same gasket and seal assembly. This completes a sub-assembly comprising the parts 10, 14, 15 and 16.

The next step in the manufacturing procedure is to fill the peripheral clearance space between the outside edge of the piston 14 and the inside peripheral wall of the housing 10 with a flexible sealant 60, such as an air curing silicone rubber compound for example. After the sealant is cured, a suitable rubber compound 61 is vulcanized to the radiating face of the piston 14 and to the peripheral portion of the housing 10. In order to maintain a high degree of uniformity in the response characteristic of the transducer, despite varying temperature and pressure, I have found it preferable to utilize Polybutadiene in the formulation of the rubber-like materials used to make the gasket 16 and the molded compound 61. Polybutadiene has relatively low losses as compared with neoprene for example. Also, it maintains a relatively constant compliance under varying compressional stresses on the gasket. Furthermore, to obtain a desired compliance versus pressure relationship for the gasket 16, openings or grooves may be provided in the flat surface of the gasket 16 (not shown in the drawing).

Thereafter, a washer-like weight member 62 is chosen to match a dynamic stiffness value of the ceramic cylinder 21. The method for determining this dynamic stiffness of the ceramic cylinder will be described later. An insulating spacer 32 (such as a thin bakelite sheet) is placed between the ends of the ceramic cylinder 21 and the metal weight or washer 62. Likewise, a similar spacer 33 is placed between the ceramic cylinder 21 and the metallic inertial tail mass 42.

The accurate alignment of the assembly comprising the basic elements in the vibrating structure is preferably accomplished by means of a fixture which fits the accurately machined diameter of the flanged portion 12 of the housing structure 10. The fixture includes concentric guide surfaces for locating parts 62, 21, 32, 33 and 42. During the assembly of the various components, a suitable cement such as epoxy is used between each of the mating surfaces of the concentrically aligned elements. Also, during the assembly of the piston 14, within the housing 10, the recessed surface 12 of the housing 10 is used to accurately locate the concentricity of the piston 14.

A threaded rod or stress bolt 70 is attached on one end to the piston 14. The other end is provided with a nut 71, collar 72, and one or more Belleville springs 73. This stress bolt and spring assembly enables the application of an exact compression stress on the ceramic cylinder. This constant stress bias is retained under varying temperatures. A recess is preferably provided in the inertial tail mass 42 for nesting the Belleville springs.

In order to form the inner stress cone insulation surfaces 35, I found that a suitable procedure is as follows: During the initial mechanical assembly of the vibrating system, a temporary bolt is substituted for the rod 70 and nut 71. After the epoxy cement joints between the ceramic ends and the other elements in the assembly have cured, the temporary bolt is removed. A viscous baking varnish or epoxy is poured into the inside region of the ceramic cylinder 21 through the opening in the center of the inertial tail mass 42. The insulating liquid is then poured out through the same opening leaving a heavy bead of insulation which collects at each end of the ceramic cylinder material. After curing, the resulting tapered bead provides the necessary stress cone for corona protection.

Another suitable procedure for providing the insulating coatings 34 and 35 consists of applying a heavy coating of epoxy cement at both ends of the ceramic cylinder during the initial assembly procedure mentioned above. In this way, the extra cement is squeezed out and a bead 34 and 35 remains, after the curing of the cemented assembly.

During the assembly procedure mentioned above, it was indicated that the dynamic stiffness of each ceramic cylinder is mated with a selected corresponding weight member 62, in order to maintain an exact resonance frequency of the transducer.

A method for measuring the dynamic stiffness of each ceramic cylinder is illustrated in FIG. 2. Here a cylindrical weight member 81 is placed on a soft foam rubber pad 82, which in turn rests on a rigid table top 83. A piezoelectric cylinder 21A is placed over the weight 81. A second weight member 84, placed over the cylinder 21A, has an electrodynamic loud-speaker 85 suspended over it. The periphery of the speaker is supported by a soft sponge rubber gasket 86.

A connecting rod 87 connects the voice coil of the loud-speaker 85 to the center of the mass 84. In order to provide a good acoustic coupling to the piezoelectric cylinder, it is important for the end surfaces of the ceramic cylinder 21A and the mating faces of the weight members 81, 84 to be flat and clean. It is also necessary to provide a liquid film (such as oil or liquid soap) between the ends of the ceramic cylinder and the mating faces of the weight members.

To measure the dynamic stiffness of a particular ceramic cylinder, that cylinder 21A is placed between the upper and lower weight members 84 and 81. Thereafter, an oscillator 88 is connected to supply a variable frequency signal to the dynamic speaker 85. A digital frquency meter 89 indicates the instantaneous frequency of the oscillator 88.

As the frequency of the oscillator is varied, the output signal generated across the electrode surfaces of the ceramic is measured by an electronic voltmeter or by an oscilloscope 90. Thus, the instantaneous magnitude of this output signal can be observed. The frequency of the oscillator 88 is varied until a maximum signal output is generated by the ceramic. The particular frequency at which this maximum output occurs identifies the mechanical stiffness of the particular ceramic cylinder 21A.

The maximum output occurs at resonance of the ceramic, with the fixed weight members 81 and 84. Any observed variation in the resonant frequency is attributable to the variations in the stiffness of the ceramic. Thus, the measured resonant frequency of the ceramic, under standardized loading, becomes a criterion for selecting the mass element 62 in the transducer assembly. In other words, the higher the resonant frequency, the higher the stiffness of the ceramic cylinder 21A. The stiffer ceramic cylinder has a heavier weight 62 selected to be associated with it during the final assembly.

An alternative arrangement for measuring the compliance of the ceramic cylinder 21A is to connect the oscillator 88 directly to the electrodes of the ceramic. This connection is made in series with a resistance which is higher in magnitude than the reactance of the ceramic, over the frequency region of measurement. A constant current is supplied to the ceramic as the oscillator frequency is varied. A voltmeter or oscilloscope is connected across the ceramic electrodes to measure a signal which varies as a function of the motional impedance of the ceramic. As the frequency is varied, a dip occurs in the signal representing motional impedance at the resonant frequency, as observed on the voltmeter.

Specific illustrations are here given for achieving an improved uniformity in the performance characteristics of a mass-loaded ceramic transducer. Also, specific structural improvements are shown to greatly increase the corona threshold voltage of a ceramic transducer assembly, especially one designed for high-power underwater operation. Other variations will occur to those skilled in the art.

Therefore, it is to be understood that the appended claims should be construed to cover all equivalent structures falling within the true spirit and scope of the invention.

I claim:

1. An electroacoustic transducer comprising a vibratile piston having an outer surface for generating sound waves, said piston having an inner plane surface, an open cup-shaped housing structure having an outer peripheral wall portion, the inner shape of said wall portion being contoured to provide a clearance for said piston, a flat plane surface forming the inner base of said cup-shaped housing, a resilient gasket means for sealing the inner rear plane surfaces of said piston and the inner flat base portion of said housing, means comprising a flexible elastomer bonded to the front surface of said piston and to the peripheral edge of said cup-shaped housing structure whereby said piston and said housing structure are flexibly mounted and sealed in concentric relationship, electroacoustic transducer means, inertial mass means, and means for bonding said transducer means between said piston and said inertial mass means whereby mechanical oscillatory forces generated by said transducer means are simultaneously imparted to drive said vibratory piston and said inertial mass.

2. The invention of claim 1 and a rigid tubular housing structure surrounding said transducer structure and providing a waterproof seal between said cup-shaped housing and the space inside side tubular housing.

3. The invention of claim 2 wherein said electroacoustic transducer means is a piezoelectric material, a layer of electrical insulation material being interposed between the bonded surfaces of said piezoelectric transducer means, said vibratile piston and said inertial mass means.

4. The invention of claim 3 further characterized in that said piezoelectric element comprises a polarized ceramic cylinder having plane parallel end surfaces, said electrode surfaces being applied to the outside and inside walls of said ceramic cylinder, and further characterized in that said piston and said rigid mass element are attached to the opposite plane parallel end surfaces of said ceramic cylinder.

5. The invention of claim 4 wherein said tubular housing structure includes a rigid bulkhead comprising a disk rigidly attached to the inner wall surface of said tubular housing, said rigid bulkhead forming a rigid wall within said tubular housing, and a rubber-like compound filling the space between the outer periphery of said inertial mass element and the inner wall surface of said tubular housing, said rubber-like compound filling the space between the free end of said inertial mass element and the bulkhead surface within said tubular housing.

6. The invention of claim 4 further characterized in that said piezoelectric element comprises a polarized ceramic cylinder having plane parallel end surfaces, said electrode surfaces being applied to the outside and inside wall surfaces of said ceramic cylinder, and further characterized in that said piston and said rigid mass element are attached to the opposite plane parallel end surfaces of said ceramic cylinder.

7. The invention of claim 6 further characterized in that a coating of dielectric material covers the regions of said ceramic cylinder in the vicinity of the ends of the electrode surfaces and the nearby surfaces of the electrical insulation material interposed between the ends of the ceramic cylinder and the attached piston and mass element.

8. A method of adjusting the resonant frequency of an electroacoustic transducer including a polarized ceramic tube mechanically coupled between a vibratile piston and an inertial mass element to simultaneously transmit oscillatory forces to both said piston and said element, said method including the steps of: (1) measuring the mechanical compliance of said ceramic tube; (2) selecting a weight having a magnitude which corresponds to the magnitude of the compliance of the particular ceramic tube; and (3) attaching said selected weight to said piston in combination with said measured ceramic tube.

9. A method for measuring the compliance of a polarized ceramic transducer element having opposite vibrating surfaces including the following steps: (1) mounting said ceramic element with its opposite vibrating surfaces in intimate contact with two standard weight members; (2) measuring the resonant frequency of said ceramic element in combination with the said two standard weight members; and (3) segregating the ceramic tubes into groups corresponding to differences in said measured resonant frequency.

10. The invention of claim 9 characterized in that the resonant frequency of the coupled system is measured by driving one of the mass elements by an oscillatory force of adjustable frequency, and further characterized in that the resonant frequency is determined by observing the peak output voltage generated by the ceramic element as the frequency of the driving force is varied.

11. The invention of claim 9 further characterized in that the resonant frequency is measured by driving the ceramic element responsive to the output of a variable frequency, constant current source, while observing the frequency at which a dip occurs in the voltage measured across the ceramic terminals as the frequency of the current source is varied.

* * * * *